United States Patent [19]

Rupprecht

[11] 4,088,311
[45] May 9, 1978

[54] TENSION SPRING ARRANGEMENT

[75] Inventor: Kurt Rupprecht, Wolfsburg, Germany

[73] Assignee: Volkswagenwerk Aktiengesellschaft, Wolfsburg, Germany

[21] Appl. No.: 789,254

[22] Filed: Apr. 20, 1977

[30] Foreign Application Priority Data

May 3, 1976 Germany .............................. 2619123

[51] Int. Cl.² .............................................. F16F 1/12
[52] U.S. Cl. ..................................... 267/74; 188/216; 267/174; 267/179
[58] Field of Search ..................... 267/69, 73, 74, 170, 267/171, 174, 175, 176, 179; 188/216

[56] References Cited

U.S. PATENT DOCUMENTS

| Re. 23,974 | 4/1955 | Foster | 267/170 |
| 1,168,771 | 1/1916 | Weatherley | 267/74 |
| 1,711,300 | 4/1929 | Ziegler | 267/74 |

FOREIGN PATENT DOCUMENTS 1,359,338  3/1964  France .................................. 188/216

Primary Examiner—Trygve M. Blix
Assistant Examiner—Edward R. Kazenske
Attorney, Agent, or Firm—Spencer & Kaye

[57] ABSTRACT

A tension spring arrangement in which a coil-type tension spring has a plurality of turns and two off-center hook portions joining, respectively, the two turns at the opposite ends of the spring body. When the spring is in its non-installed state, the inclination of the hook portions with respect to the longitudinal axis of the spring is different from the inclination of the hook portions when the spring is in its installed state, the difference in inclination being such that when the spring is in its installed state, there is applied to the spring body a resultant bending moment which, in magnitude and direction, is at least approximately equal to the bending moment which would be applied to the spring body were the hook portions arranged not off-center but in alignment with the longitudinal axis of the spring.

2 Claims, 7 Drawing Figures

U.S. Patent  May 9, 1978  4,088,311
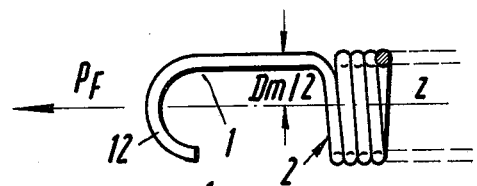
Fig. 1a PRIOR ART
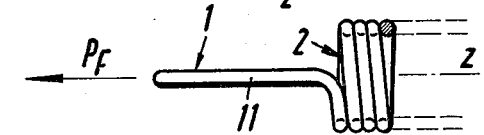
Fig. 1b PRIOR ART
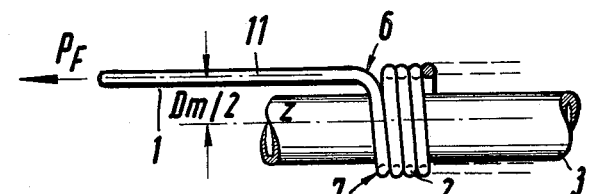
Fig. 2a PRIOR ART
Fig. 2b PRIOR ART
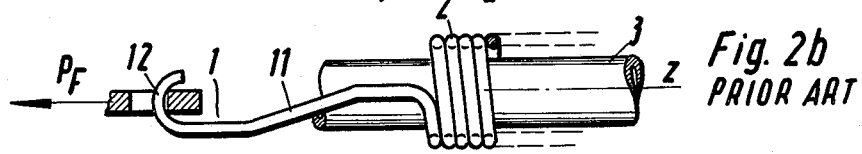
Fig. 3 PRIOR ART
Fig. 4a
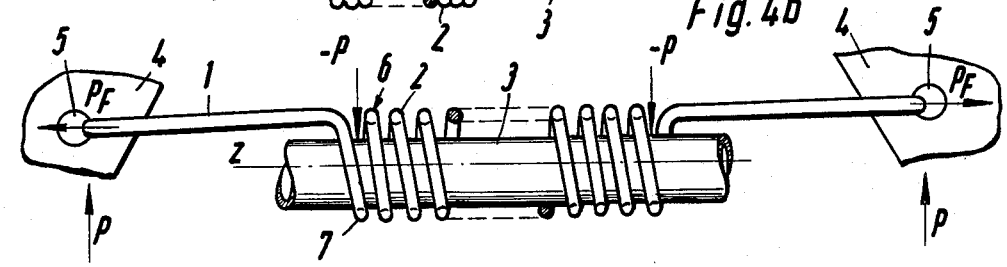
Fig. 4b

TENSION SPRING ARRANGEMENT

BACKGROUND OF THE INVENTION

The present invention relates to a coil-type tension spring.

Springs of the above type are usually provided with hook portions having eyelets or the like which are in alignment with the central longitudinal axis of the spring. Normally, such springs are build into a piece of equipment in such a way that the spring force which the spring is to exert is in alignment with the spring itself, i.e., the spring is normally hooked in place in such a way that the longitudinal central axis of the spring coincides with the direction in which the spring force is to be exerted. In such arrangements, the spring will be subjected to central and, therefore, symmetrical loads.

In many cases, however, the need arises to make use of eccentric or non-symmetrical springs, that is to say, springs having off-set hook portions whose eyelets are not in alignment with the central longitudinal axis of the spring body. One reason for this may, for example, be lack of space in the particular mechanical structure in which the spring is to be used. Spring arrangements incorporating such off-set springs are provided with special abutments which are arranged either interiorly or exteriorly of the spring body so as to act at right angles to the longitudinal axis of the spring. The purpose of these abutments is to maintain the spring in position and to prevent the spring from being deflected laterally whenever the spring is placed under tension. Springs of this type, namely, springs having off-center hook portions, are used, for example, as return springs for brake shoes which coact with the brake drum of the wheel of a motor vehicle.

As will be explained in detail below, off-center springs of the above type, while useful and necessary in certain installations, have the drawback that they are subject to non-symmetrical forces which, in turn, cause certain undesired deformations in the spring. It is, therefore, a primary object of the present invention to provide an off-center coil-type spring which overcomes the drawbacks resulting from non-symmetrical application of force.

BRIEF DESCRIPTION OF THE INVENTION

With the above object in view, the present invention resides, basically, in a coil-type tension spring having a spring body with a plurality of turns and two-off center hook portions joining, respectively, the two turns at the opposite ends of the spring body, with at least these two end turns of the spring body coacting with abutment means which act at right angles to the longitudinal axis of the spring, thereby to maintain the spring in position. According to the present invention, when the spring is in its non-installed state, the inclination of the hook portions with respect to the longitudinal axis of the spring is different from the inclination of hook portions when the spring is in its installed state, the difference inclination being such that when the spring is in its installed state, there is applied to the spring body a resultant bending moment which, in magnitude and direction, is at least approximately equal to the bending moment which would be applied to the spring body were the hook portions arranged not off-center but in alignment with the longitudinal axis of the spring.

In accordance with a preferred embodiment of the invention, various parameters are so selected that the difference in inclination at least approximately satisfies an equation which is likewise set forth below.

BRIEF DESCRIPTION OF THE DRAWINGS

FIG. 1a is a fragmentary side view of a conventional, prior art coil-type tension spring which is provided with eyelets that are aligned with the longitudinal axis of the spring.

FIG. 1b is a fragmentary top plan view of the spring shown in FIG. 1a.

FIG. 2 is a fragmentary side view of conventional, prior art coil-type spring which is provided with off-center hook portions, i.e., with hook portions whose eyelets are not aligned with the longitudinal axis of the spring. The spring is shown while it is not under tension.

FIG. 2b is a fragmentary top plan view of the spring shown in FIG. 2a.

FIG. 3 is a side view showing the prior art, off-center spring of FIGS. 2a, 2b, but shows the spring as being in installed state and with the spring under tension. Specifically, the spring is shown as being used as a return spring for the brake shoes of a drum-type wheel brake.

FIG. 4a is a side view of an off-set coil-type tension spring according to the present invention, the same being in its non-installed state, i.e., before it is hooked into the two brake shoes of a drum-type wheel brake.

FIG. 4b is a side view of the spring of FIG. 4b but showing the same after it has been hooked into the two brake shoes and thus in its installed state.

DETAILED DESCRIPTION OF THE PREFERRED EMBODIMENTS

Referring now to the drawings, reference will first be had to the prior art springs depicted in FIGS. 1a, 1b and 2a, 2b. FIGS. 1a and 1b show a conventional tension spring having on-center hook portions while FIGS. 2a and 2b show a conventional tension spring having off-center hook portions. In each case, the turns which make up the spring body are shown generally at 2 and the hook portions, which join the two turns at the opposite ends of the spring body — actually, only one hook portion is shown in each of FIGS. 1a, 1b; 2a, 2b — are shown generally at 1. Each of the hook portions itself is made up of an elongated section 11 and a hooked eyelet section 12. As is well known in the art, the spring is hooked into the component with which the spring is to coact such that the spring force $P_F$ acts on the spring at the eyelet section 12.

As is apparent from FIGS. 1a and 1b, the spring force exerted by the on-center spring acts precisely along the same line as the longitudinal axis of the spring, and the individual turns of the spring will, at each point of the circumference, be subjected to a bending moment $M_B = P_F D_m/2$, where $D_m$ is the average diameter of the turns of the spring. The practical significance of this is that the tension to which the spring is subjected will be distributed evenly throughout the material of which the spring is made.

Insofar as the off-center spring of FIGS. 2a and 2b is concerned, however, the line of action of the spring force is displaced by the distance $D_m/2$ from the longitudinal center axis of the spring. Consequently, the application of a spring force $P_F$ will cause bending moments of different magnitudes to be applied to different portions of the spring. Specifically, the bending moment will be equal to zero in the region 6 of the spring body because at this point the length of any lever arm which would produce a bending moment is itself equal to zero. On the other hand, in the region 7 of the spring body the bending moment $M_B = P_F \cdot D_m$, which is twice as large as the bending moment to which all parts of the spring body of the symmetrically tensioned spring in FIGS. 1a, 1b, are subjected. Consequently, there is a tendency for the spring to bend, i.e., for the individual turns of the spring to be displaced laterally. To prevent this, abutment means 3 are provided which act at right angles to the direction of the spring and which serve to maintain the spring in position. The abutment means may be constituted by a bolt or pin which passes through the interior of the coil spring. Even so, when the spring is tensioned, it will undergo certain deformation in that the individual turns, while prevented from moving laterally, will assume different inclinations and pitches. This is shown in FIG. 3 which depicts the spring of FIGS. 2a, 2b, while the same is in use and under tension.

FIG. 3 shows the spring installed in a drum-type brake so as to serve as the return spring for two brake shoes 4, the latter being provided with openings 5 which allow the eyelet sections of the spring to be hooked into the brake shoes. Here, the abutment 3 for preventing lateral displacement of the spring body is constituted by a push rod assembly arranged between the brake shoes. Experience has shown that such an arrangement is typical of one where there is insufficient space to provide an on-center spring of the type illustrated in FIGS. 1a, 1b, because the space available above the push rod assembly is too small. FIG. 3 likewise shows how the tension acting on the spring causes the spring to be deformed; note the different pitches and inclinations of the various turns of the spring.

One characteristic feature of conventional off-center springs of the type shown in FIGS. 2a, 2b, 3, is that the hook portions 1 occupy the same position with respect to the longitudinal axis of the spring both in the installed and non-installed states of the spring. In the case of the spring of FIGS. 2a, 2b, 3, the hook portions 1 extend parallel to the longitudinal axis of the spring both before and after installation of the spring, i.e., the spring will have the same shape when it is "on the shelf" and when it is part of the assembled brake.

According to the present invention, however, there is provided an off-center coil spring in which, when the spring is in its non-installed state, the inclination of the hook portions with respect to the longitudinal axis of the spring is different from the inclination of the hook portions when the spring is in its installed state. Specifically, the difference in inclination is such that when the spring is in its installed state, there is applied to the spring body a bending moment which, in magnitude and direction, is at least approximately equal to the bending moment which would be applied to the spring body where the hook portions arranged not off-center but in alignment with the longitudinal axis of the spring. In this way, the tension to which the off-center spring is subjected will be distributed throughout the material of which the spring is made at least approximately as evenly as in the case in a symmetrical or on-center spring.

A spring according to the present invention is shown in FIGS. 4a and 4b, the former showing the spring in its as yet non-installed state and the latter showing the spring in its installed state, namely, as being hooked into the openings 5 of the two brake shoes 4 of a drum-type wheel brake. It will be seen that so long as the spring is in its non-installed state and is not subjected to any tension, the hook portions are bent toward the longitudinal axis of the spring. When, however, the spring is installed and made to assume the position shown in FIG. 4b, a bending moment $M = P \cdot l$ is applied in clockwise direction to the left-hand end of the spring body 2 and in counter-clockwise direction to the right-hand end, P being the transverse force acting on the hook portion $l$ and $l$ being the distance between the spring body and the inner edge of the eye section forming part of the hook portion.

For the sake of simplicity of illustration, the length $l$ of each spring portion 1 is shown as being that component of the spring portion length which extends parallel to the axis of the spring when the spring is in its non-installed state. It will be appreciated that, in view of the fact that the angle $\alpha$ will be relatively small, the difference between the slant length of spring portion as shown in FIG. 4b and the length $l$ shown in FIG. 4a will, in practice, be negligible.

It will be understood that the bending moment M brought about by the forced straightening of the hook portions 1 will be superimposed on the bending moment $M_B$ which is produced by the spring force $P_F$ acting on the eyelet sections of the hook portions 1 in such a manner that the resultant bending moment occuring in the region 7 of the spring will, due to the opposite directions of the bending moments M and $M_B$, be decreased whereas the resultant bending moment will be increased in the region 6 due to the cumulative effect of M and $M_B$. The inclination of the hook portions 1 of the non-installed spring (FIG. 4a) is selected such that when the spring is made to assume its installed position (FIG. 4b), the bending moment which will be applied to the spring body 2 will be the same, or at least approximately the same, as in the case of symmetrical or on-center springs.

$$M_B = P_F D_m/2 = M = P \cdot l \tag{1}$$

$$P = M_B/l = P_F(D_m/2 \cdot l) \tag{2}$$

Care should be taken to note the rotational direction of the applied moment. The greater the length $l$ of the hook portion, the smaller will be the amount of transverse force P that is required as well as the bending stress on the first and last turns of the spring body, i.e., the two turns at the opposite ends of the spring body, these being the turns which will take up the reaction force which opposes the force P. In order to obtain the desired transverse force P, the ends of the hook portions have to be displaced a distance $f_1$ (FIG. 4a) with respect to the position which the hook portions will occupy when the spring is in its installed state. This distance $f_1$ can be calculated according to conventional mechanical principles applicable to carriers of constant cross section which are supported at only one end, according to the equation $$f_1 = \frac{l^3}{3 \cdot E \cdot I} P. \tag{3}$$

Substituting for P the value obtained by Equation (2), there is obtained $$f_1 = \frac{D_m \cdot l^2}{6 \cdot E \cdot I} P_F. \tag{4}$$

where, as stated above, $D_m$ is the average diameter of the turns of the spring, $l$ is the distance between the spring body and the inner edge of the eye section forming part of the hook portion, and $P_F$ is the spring force of the spring, i.e., the rated spring force which the spring is to exert when it is installed. The other parameters $E$ and $I$, are, respectively, the modulus of elasticity and the moment of inertia of the spring. The difference in inclination of the hook portions with respect to the longitudinal axis of the spring, when the spring is in non-installed and in installed state, will therefore be $$\tan \alpha = \frac{f_1}{l} = \frac{D_m \cdot l \cdot P_F}{6 \cdot E \cdot I} \quad (5)$$

Thanks to the above arrangement, the material of which the spring equipped with off-set hook portions is made, is subjected to loads at least approximately in the same manner as is the material of a symmetrically stressed spring. Only the two end turns will, due to the additionally applied transverse force, be subjected to slightly higher loads than the two end turns of a symmetrical or on-center spring. Moreover, as can be seen by comparing FIGS. 3 and 4b, the deformations occurring in the prior art non-symmetrical springs, namely, the different pitches and inclinations of the individual turns of the spring, do not occur in the case of a non-symmetrical spring according to the present invention.

It will be understood that the above description of the present invention is susceptible to various modifications, changes and adaptations, and the same are intended to be comprehended within the meaning and range of equivalents of the appended claims. For example, the off-center or non-symmetrical spring described above is one in which the hook portions are inclined with respect to the longitudinal axis of the spring when the spring is in its non-installed state but are parallel to the longitudinal spring axis when the spring is in it installed state. It will be appreciated, however, that the advantageous effects described above can be obtained with differently configured springs. For example, the spring can be such that the hook portions are approximately parallel to the longitudinal spring axis when the spring is in its non-installed state and, when the spring is in its installed state, are made to incline upwardly away from the spring axis. As is the case in the embodiment shown in FIGS. 4a and 4b, the significant feature will be that the hook portions of the spring are inclined differently when the spring is in its non-installed state than when the spring is in its installed state.

The following is an illustrative but not limitative numerical example of an off-center spring according to the present invention, the same setting forth numerical valves as well as the dimensional units of the various parameters.

A spring intended for use as a return spring connectible to the brake shoes of a brake of a passenger vehicle and expected to be subjected to a given spring force $P_F$ has the following characteristics:

$f_1 = 2.89$ millimeters.

$D_m = 16$ millimeters.

$l = 42$ millimeters.

rated $P_F = 10.14$ kp $E = 21,000$ kp/mm$^2$ $I = 0.785$ mm$^4$ for a wire diameter of $d = 2$ millimeters.

Substituting the foregoing values in Equation (5), there is obtained a value for tan $\alpha$ of 0.06889, or an angle $\alpha$ of approximately 3.94°.

The following is another illustrative but not limitative numerical example of a spring according to the present invention, the same being of the type in which the spring portions 1 extend parallel to the spring axis when the spring is not in its installed state and are inclined away from the spring axis when the spring is in its installed state. Such a spring, which is likewise intended for use as a return spring connectible to the brake shoes of a passenger vehicle and expected to be subjected to a given rated spring force $P_F$, has the following characteristics:

$f_1 = 2.89$ millimeters.

$D_m = 16$ millimeters.

$l = 42$ millimeters.

rated $P_F = 10.14$ kp $E = 21,000$ kp/mm$^2$ $I = 0.785$ mm$^4$ for a wire diameter of $d = 2$ millimeters.

Substituting the foregoing values in Equation (5), there is obtained a value for tan $\alpha$ of 0.06889 or an angle $\alpha$ of approximately 3.94°.

What is claimed is:

1. In a spring arrangement comprising a coil-type tension spring having a spring body with a plurality of turns and two off-center hook portions joining, respectively, the two turns at the opposite ends of the spring body, at least said two end turns of said spring body coacting with abutment means which act at right angles to the longitudinal axis of the spring thereby to maintain the spring in position, the improvement that when the spring is in its non-installed state, the inclination of said hook portions with respect to the longitudinal axis of the spring is different from the inclination of said hook portions when said spring is in its installed state, the difference in inclination $\alpha$ being such that when the spring is in its installed state, there is applied to said spring body a bending moment which, in magnitude and direction, is at least approximately equal to the bending moment which would be applied to said spring body were said hook portions arranged not off-center but in alignment with said longitudinal axis of said spring.

2. The improvement defined in claim 1, wherein said difference in inclination $\alpha$ is such so as at least approximately to satisfy the equation $$\tan \alpha = \frac{f_1}{l} = \frac{D_m \cdot l \cdot P_F}{6 \cdot E \cdot I}$$

where $f_1$ is the distance normal to said longitudinal axis of said spring through which said hook portion is displaced from said non-installed state to said installed state, $D_m$ is the average diameter of said turns of said spring, $l$ is the distance between said spring body and the inner edge of an eye section forming part of said hook portion, $P_F$ is the rated spring force which the spring is to exert when it is installed, E is the modulus of elasticity of said spring, and I is the moment of inertia of said spring.

* * * * *